United States Patent
Willcox et al.

(10) Patent No.: US 10,597,753 B2
(45) Date of Patent: Mar. 24, 2020

(54) SYSTEMS AND METHODS OF EFFICIENTLY RECOVERING PRECIOUS METALS USING AN ALKALINE LEACH, ULTRASOUND, AND ELECTROLYSIS

(71) Applicant: All Green Recycling, Inc., Charlotte, NC (US)

(72) Inventors: John Christopher Willcox, Bridgewater, NJ (US); Matthew James Johnson, Charlotte, NC (US); Peter J. Jegou, Charlotte, NC (US)

(73) Assignee: ALL GREEN RECYCLING, INC., Charlotte, NC (US)

( * ) Notice: Subject to any disclaimer, the term of this patent is extended or adjusted under 35 U.S.C. 154(b) by 0 days.

(21) Appl. No.: 16/579,595

(22) Filed: Sep. 23, 2019

(65) Prior Publication Data

US 2020/0017935 A1    Jan. 16, 2020

Related U.S. Application Data (63) Continuation-in-part of application No. 15/955,525, filed on Apr. 17, 2018, now Pat. No. 10,422,019, which is a continuation of application No. 15/249,617, filed on Aug. 29, 2016, now Pat. No. 10,202,668.

(60) Provisional application No. 62/210,746, filed on Aug. 27, 2015.

(51) Int. Cl.
*C22B 11/00* (2006.01)
*C22B 7/00* (2006.01)
*C22B 3/00* (2006.01)

(52) U.S. Cl.
CPC ............ *C22B 11/046* (2013.01); *C22B 7/006* (2013.01); *Y02P 10/214* (2015.11); *Y02P 10/234* (2015.11)

(58) Field of Classification Search
CPC ....... C22B 11/046; C22B 7/006; C22B 7/008; Y02P 10/214; Y02P 10/234
See application file for complete search history.

(56) References Cited

U.S. PATENT DOCUMENTS

| | | | | |
|---|---|---|---|---|
| 3,650,958 | A * | 3/1972 | Shipley | C23F 1/46 252/79.1 |
| 3,772,105 | A * | 11/1973 | Shipley | C23F 1/46 216/93 |
| 2010/0059910 | A1* | 3/2010 | Chen | C22B 3/02 266/168 |
| 2010/0181205 | A1* | 7/2010 | Thpmas | B03B 9/061 205/568 |
| 2016/0122846 | A1* | 5/2016 | Korzenski | C22B 3/0005 75/744 |
| 2018/0230571 | A1* | 8/2018 | Willcox | C22B 11/046 |

* cited by examiner

Primary Examiner — Cam N. Nguyen
(74) Attorney, Agent, or Firm — NK Patent Law (57) ABSTRACT

The subject matter described herein includes a method for extracting a desired metal from a substance. The method includes contacting the substance with an alkaline leach to separate the desired metal from the substance, providing ultrasound energy and anodic current on a work face of the substance, etching the substance with the alkaline leach, thereby releasing the desired metal from the substance, and collecting the released desired metal.

15 Claims, 6 Drawing Sheets

SYSTEMS AND METHODS OF EFFICIENTLY RECOVERING PRECIOUS METALS USING AN ALKALINE LEACH, ULTRASOUND, AND ELECTROLYSIS

CROSS REFERENCE TO RELATED APPLICATION

This application is a continuation in-part of U.S. Non-Provisional patent application Ser. No. 15/955,525, filed Apr. 17, 2018, which claims priority to U.S. Non-Provisional patent application Ser. No. 15/249,617 filed Aug. 29, 2016, which claims priority to U.S. Provisional Patent Application No. 62/210,746 filed Aug. 27, 2015, each of which is incorporated herein by reference in its entirety.

TECHNICAL FIELD

The present invention relates generally to the field of metal recovery, and more particularly, to processes for the selective recovery of a desired metal (e.g., gold, silver, palladium, etc.) from waste product(s).

BACKGROUND

Using etchants for copper removal is known. Certain traditional etchants are typically highly acidic cupric chloride solutions that use chloride as a complexing agent to stabilize copper in solution. Use of these traditional etchants and processes are often disadvantageous due to their corrosive and toxic nature. Moreover, etching reactions associated with metal reclamation often prematurely quench due to the formation of metal oxide(s) (e.g., copper oxide(s)) at higher copper concentrations during these processes, thus highly limiting metal recovery yields, the rate of overall metal recovery/etching reactions, metal reclamation duration, or a combination thereof when using traditional processes.

Therefore, a need exists to provide processes that avoid the above mentioned disadvantages of traditional copper etching while concurrently increasing desired metal recovery yields from waste products.

SUMMARY

This summary is provided to introduce, in a simplified form, concepts that are further described in the following detailed descriptions. This summary is not intended to identify key features or essential features of the claimed subject matter, nor is it to be construed as limiting the scope of the claimed subject matter.

It is an object of the invention to provide a method for extracting a desired metal contained in electronic waste having a substrate and desired metal integrally formed with copper. In certain aspects, the method is a continuous system in which a cupric amine solution is constantly provided and removed while maintaining copper concentration, predetermined temperature conditions, ultrasound energy conditions (frequency), or any combination thereof to prevent and/or limit metal oxide formation and/or accumulation during the method. The formation of metal oxides (e.g., copper oxides), hydroxides, and other solids (collectively by-products) at higher copper concentrations during the method disadvantageously limits etching conditions at the surface of the workface, and in certain aspects, quenches/stops etching from occurring. Therefore, by limiting by-products formation at the surface of a workface as disclosed herein via the use of ultrasound energy during, for example, any combination of steps (a)-(d) discussed herein, etching may continue throughout the method, thus allowing for optimum collection of the desired metal.

The disclosed method includes (a) contacting the electronic waste with a cupric amine solution to separate the desired metal integrally formed with copper from the substrate and the copper; (b) either during or immediately after step (a), providing ultrasound energy at a frequency ranging from 15 to 45 KHz, more preferably from 25 KHz to 35 KHz, most preferably from 29.5 KHz to 30.5 KHz that sweeps between 100 to 130 times per second, and has an energy density of 4 to 8 watts per cubic inch. and at a temperature ranging from 45° C. to 60° C. thereby limiting copper oxide (CuO), hydroxides, and other by-product formation on a work face of the electronic waste in an ultrasound equipped tank; (c) etching the copper with the cupric amine solution at a temperature ranging from 45° C. to 60° C. for between 40 to 70 hours thereby releasing the desired metal from the substrate and the copper; (d) collecting the released desired metal of step (c); and (e) optionally further separating and/or purifying the desired metal of step (d) thereby resulting in a concentrated form of the desired metal. In certain aspects, the desired metal includes at least one metal selected from the group consisting of gold, palladium, and silver, and if step (e) is conducted, the desired metal has a purity of at least 90%.

In certain aspects, step (e) is conducted and the desired metal has a purity of at least 99%.

In certain aspects, steps (a)-(c) occur from 25 hours to 60 hours.

In certain aspects, steps (a)-(c) occur from 35 hours to 55 hours.

In certain aspects, steps (a)-(c) occur from 45 hours to 50 hours.

In certain aspects, the electronic waste includes integrated circuit boards, printed circuit boards, capacitors, or a combination thereof, and step (e) is conducted such that the desired metal has a purity of 95%.

In certain aspects, the cupric amine solution comprises at least copper ions at concentration ranging from 0.7 mol/L to 1.1 mol/L, ammonium hydroxide at a concentration ranging from 6.5 mol/L to 8.5 mol/L, and ammonium carbonate at a concentration ranging from 0.7 mol/L to 1.1 mol/L.

In certain aspects, the ultrasound energy of step (b) ranges from 25 to 35 KHz.

In certain aspects, the method further includes providing ultrasound energy ranging from 25 to 35 KHz throughout step (c) thereby limiting solid metallic oxide(s) formation (e.g., CuO formation) and other by-products at the surface of the workface. In certain aspects, the method further includes providing ultrasound energy ranging from 25 to 35 KHz throughout any combination of steps (a)-(d) thereby limiting solid metallic oxide(s) formation (e.g., CuO formation) and other by-products at the surface of the workface.

In certain aspects, steps (a)-(c) are performed in an ultrasound equipped reaction chamber having a volumetric capacity of 200 gallons up to 2000 gallons. In certain aspects, the ultrasound equipped reaction chamber has a volumetric capacity of 200 gallons to 250 gallons.

In certain aspects, the ultrasound equipped tank is operatively linked to a cooling tower adapted to maintain a predetermined temperature during steps (a)-(c).

In certain aspects, the ultrasound equipped tank is operatively linked to a settling tank such that the cupric amine solution is continuously passed through the ultrasound equipped tank, cooling tower, and settling tank. These features allow the predetermined temperature and copper concentration to be maintained while concurrently limiting metallic oxide(s) formation on a work face of the electronic waste in the ultrasound equipped tank. The above mentioned arrangement further promotes precipitation of metallic oxide (s) (e.g., CuO) and settling in the settling tank.

In certain aspects, the cooling tower has a volumetric capacity of between 7 to 15 gallons, more preferably from 9 to 11 gallons at between 15,000 to 30,000 BTU/hr, more preferably from 18,000 to 22,000 BTU/hr to effect desired temperature reduction promoting copper oxide precipitation in the settling tank and/or to provide a 3° C. to 8° C. reduction in the leachate fluid temperature.

In certain aspects, temperature during steps (a)-(c) optimum temperature does not exceed 60° C. If temperature of the disclosed method approaches and/or exceeds 60° C. undesirable amounts of ammonia will evaporate from the ultrasound equipped reaction chamber thereby reducing etching efficiency.

In certain aspects, disclosed is a method for extracting a desired metal contained in electronic waste having a substrate and desired metal integrally formed with copper, the method comprising: contacting the electronic waste with a cupric amine solution to separate the desired metal integrally formed with copper from the substrate and the copper; etching the copper with the cupric amine solution at a temperature ranging from 45° C. to 60° C. for between 40 to 200 hours thereby releasing the desired metal from the substrate and the copper; collecting the released desired metal; and optionally further separating and/or purifying the desired metal thereby resulting in a concentrated form of the desired metal, wherein: the desired metal includes at least one metal selected from the group consisting of gold, palladium, and silver. The cupric amine solution comprises at least copper ions at concentration ranging from 0.7 mol/L to 1.1 mol/L, ammonium hydroxide at a concentration ranging from 6.5 mol/L to 8.5 mol/L, and ammonium carbonate at a concentration ranging from 0.7 mol/L to 1.1 mol/L. In certain aspects, the etching step occurs for between 100 to 200 hours.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

Disclosed herein is a method for extracting a desired metal from a substance. The method includes contacting the substance with an alkaline leach to separate the desired metal from the substance, providing ultrasound energy and anodic current on a work face of the substance, etching the substance with the alkaline leach, thereby releasing the desired metal from the substance, and collecting the released desired metal.

According to one or more embodiments, the substance includes integrated circuit boards, printed circuit boards, capacitors, metal fragments, large irregular granules, and small irregular granules.

According to one or more embodiments, the metal fragments have a copper content between 70-80%.

According to one or more embodiments, the large irregular granules weigh between 10-20 grams.

According to one or more embodiments, the method also includes leaching the fragments for 6-15 hours wherein 50-95% of the copper is removed from the fragments.

According to one or more embodiments, the method also includes isolating precious metals from the fragment after the copper has been removed.

According to one or more embodiments, precious metals include gold, platinum, silver, iridium, and palladium.

According to one or more embodiments, the method also includes flashing off any by-products having a melting point below the desired metal.

According to one or more embodiments, the small irregular granules weigh between 0.5 and 1.5 grams.

According to one or more embodiments, a method for extracting a desired metal contained in a substance includes, contacting the substance with an alkaline leach to separate the desired metal from the substance, etching the substance with the alkaline leach, thereby releasing the desired metal from the substance, collecting the released desired metal, and purifying the desired metal, thereby resulting in a concentrated form of the desired metal, wherein the desired metal includes at least one metal selected from the group consisting of gold, platinum, silver, iridium, and palladium.

According to one or more embodiments, a method of extracting precious metals from electronic scrap includes, placing electronic scrap into an ultrasound assisted electrolytic tank in the presence of an alkaline leach and anodic current, wherein the electronic scrap includes copper, iron, and precious metals. The method also includes selectively dissolving the copper in the tank in the presence of an electrolyte, capturing iron with a magnet filter, in a centrifugal concentrator, separating the precious metals from the electronic scrap in a form of precious metal concentrate, and recovering copper in an electrowinning cell, wherein a heat pump maintains the temperature in the tank and electrowinning cell below 50 degrees Celsius, to avoid excess evaporation of alkaline leach, and produces hot water as a byproduct.

According to one or more embodiments, the alkaline leach is selected from the group consisting of ammonia, cupric amine solution, ammonium hydroxide, and ammonium carbonate.

According to one or more embodiments, the method also includes repurposing the hot water for sanitary and/or central heating purposes.

According to one or more embodiments, the method also includes sending the precious metal concentrate to a refinery.

According to one or more embodiments, the method also includes continuously withdrawing electrolyte from the tank while selectively dissolving the copper in the tank.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION

The present invention will now be described more fully hereinafter. It is to be understood that the aspects described below are not limited to specific compounds and solutions, as such may, of course, vary. It is also to be understood that the terminology used herein is for the purpose of describing particular aspects only and is not intended to be limiting. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within the ranges as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. as well as 1, 2, 3, 4, and 5, individually. The same principle applies to ranges reciting only one numerical value as a minimum or a maximum. Furthermore, such an interpretation should apply regardless of the breadth of the range or the characteristics being described.

It is understood that any given particular aspect of the disclosed compositions and methods can be easily compared to the specific examples and embodiments disclosed herein. By performing such a comparison, the relative efficacy of each particular embodiment can be easily determined. Particularly preferred compositions and methods are disclosed in the Examples herein, and it is understood that these compositions and methods, while not necessarily limiting, can be performed with any of the compositions and methods disclosed herein.

Disclosed is a method for extracting desired metal(s) contained in electronic waste having a substrate and desired metal integrally formed with copper, the method comprising: (a) contacting the electronic waste with a cupric amine solution to separate the desired metal integrally formed with copper from the substrate and the copper; (b) either during or immediately after step (a), providing ultrasound energy at a frequency ranging from 15 to 45 KHz, more preferably from 25 to 35 KHz and at a temperature ranging from 45° C. to 60° C. thereby limiting copper oxide (CuO), hydroxides, and other by-product formation on a work face of the electronic waste in an ultrasound equipped tank; (c) etching the copper with the cupric amine solution at a temperature ranging from 45° C. to 60° C. for between 40 to 70 hours thereby releasing the desired metal from the substrate and the copper; (d) collecting the released desired metal of step (c); and (e) optionally further separating and/or purifying the desired metal of step (d) thereby resulting in a concentrated form of the desired metal.

Figure 1:
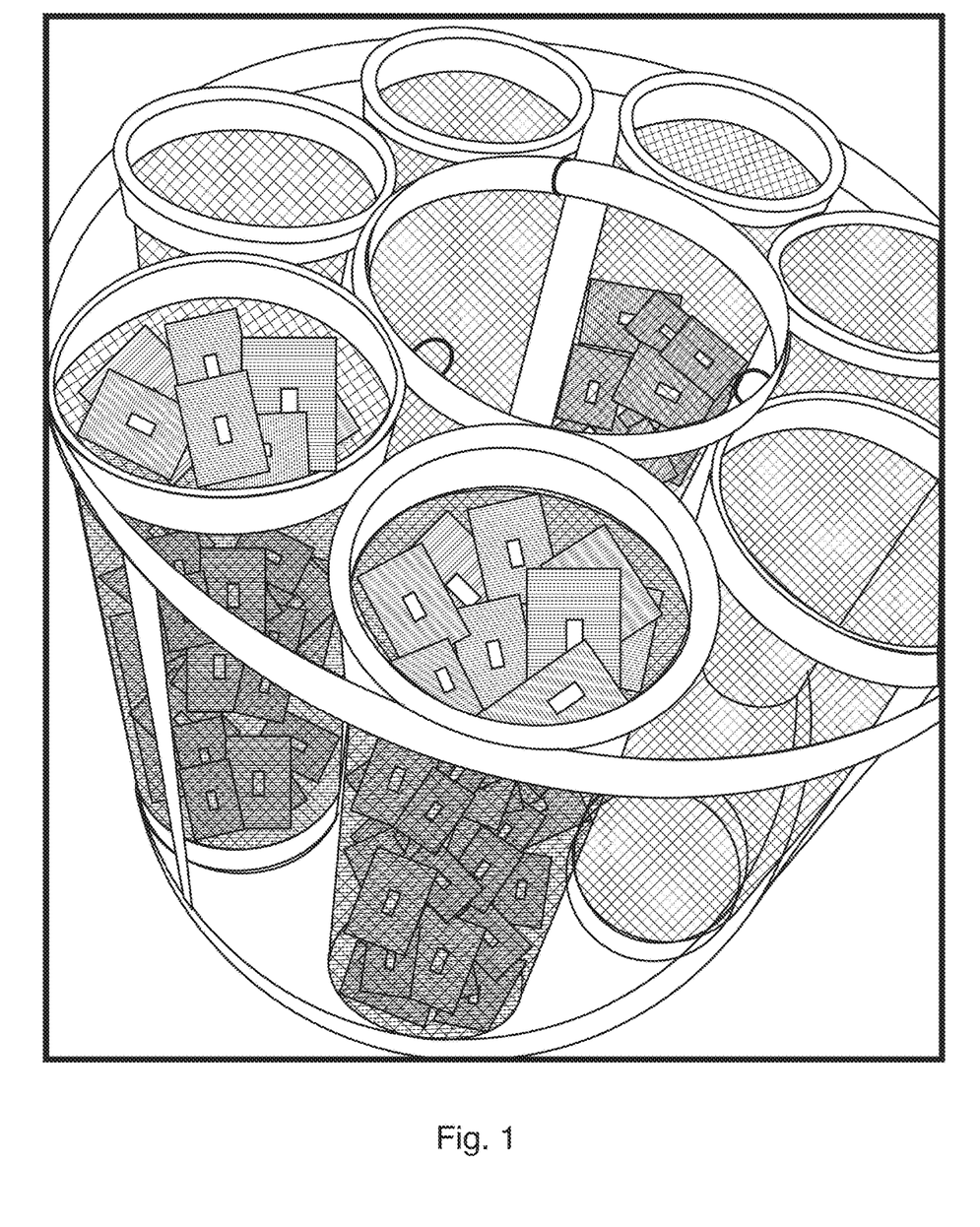
FIG. 1 depicts exemplary RAM and telecom integrated circuit boards in a container that can be subjected to the metal recovery processes disclosed herein.
Figure 2A:
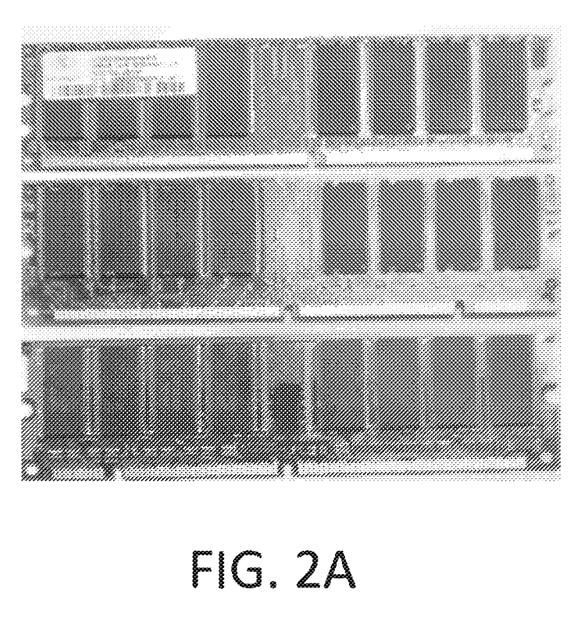
FIG. 2A depicts RAM integrated circuit boards before being subjected to the metal recovery process(es) disclosed herein and FIG. 2B depicts RAM integrated circuit boards after being subjected to the metal recovery processes disclosed herein.

In certain aspects, the disclosed process begins with obtaining a waste stream, for example, an electronic waste stream having a precious metal (i.e., the desired metal) selected from gold, palladium, silver, or any combination thereof integrally formed with copper. For example, these precious metals may be metal plated, clad, bonded, rolled or otherwise integrally formed and/or attached to a copper or copper alloy. Such waste stream may further comprise a substrate including, for example, plastic insulating layer, a fiberglass reinforced plastic, or a combination thereof. It is desirable to first separate the precious metal from the above mentioned copper, substrate, or a combination thereof, and then further subject this separated precious metal to additional separation and/or purification steps to obtain a highly purified precious metal (e.g., having at least 90% purity, at least 95% purity, at least 99% purity, etc.). For example, FIGS. 1 and 2A depicts exemplary RAM and telecom integrated circuit boards in a container that can be subjected to the metal recovery processes disclosed herein.

In certain aspects, the above mentioned waste stream includes, for example, an electronic waste stream having gold, palladium, silver, or any combination thereof plated, clad, bonded, rolled or otherwise attached to a copper or copper alloy substrate. As alluded to above, in certain aspects, this waste stream further includes a substrate that is made of, for example, plastic or ceramic to which the precious metal being integrally formed with copper is bonded to and/or attached. This waste stream is submerged in an alkaline leaching solution containing a cupric amine complex and an ammonium salt. This cupric amine complex and ammonium salt weakens the bonding between the precious metal (e.g., gold, silver, and/or palladium) and the other materials in the waste stream (e.g., undesired plastic (s), metal(s) or metal alloys such as copper, etc.) via dissolution of copper during the below chemical reaction(s). The cupric amine complex, of the form $Cu(NH_3)_4^{2+}$, acts as the primary oxidizer in the system and reacts with metallic copper according to the following equation:

The result is the dissolution of copper to form a cuprous amine complex which is quickly oxidized by dissolved oxygen to regenerate the cupric amine complex according to the equation:

During the above shown reactions, the concentration of copper in solution increases as the reaction progresses due to leaching/etching of copper from the waste stream. The ideal copper concentration in solution ranges between 0.3 M to 1.0 M and depends on the degree of agitation and the concentration of ammonium hydroxide in the system. The mechanism by which leaching slows at high copper ion concentrations is passivation of the metal surface by copper oxide and hydroxide. Higher copper concentrations generally result in higher leaching rates up until solids start to build up on the copper surface. Sufficient agitation, either by conventional propeller agitators or by sparging gases can prevent the buildup of loosely attached coatings and can extend the efficacy of the solution into higher copper concentration ranges. In certain aspects, agitation may utilize ultrasonic energy having a single frequency and varied frequencies to prevent the buildup of loosely attached coatings and can extend the efficacy of the solution into higher copper concentration ranges. In certain aspects, ultrasonic energy is applied during at least step (b) or (c) at frequency ranging from 15 to 45 KHz, more preferably from 25 KHz to 35 KHz, most preferably from 29.5 KHz to 30.5 KHz at a temperature ranging from 40° C. to 60° C., more preferably from 50° C. to 60° C. thereby limiting solid metallic oxide(s) formation (e.g., CuO formation) and other by-products at the surface of the workface. In certain aspects, ultrasonic energy may be applied during any combination of steps (a)-(d).

In certain aspects, copper is continually added to the solution due to leaching/etching and the cupric ion concentration will eventually exceed the optimal range for processing. Therefore, copper should be continually removed from the solution in order to maintain concentrations within the 0.3 M to 1.0 M range for copper in solution.

During the above shown reactions, ammonium hydroxide may be added to stabilize cupric ions in solution as a cupric amine complex and to adjust pH. Acceptable ammonium hydroxide concentrations range from 5 mol/L to 10 mol/L and due to stoichiometric considerations, the theoretical maximum copper concentration cannot exceed one fourth of this molarity.

Figure 4:
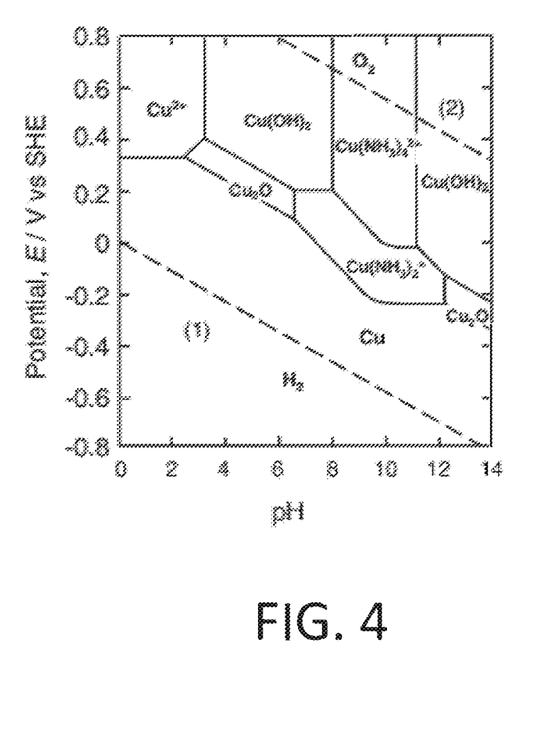
FIG. 4 depicts a Pourbaix diagram showing the stability range of the cupric amine complex ion.

Solution pH can vary within the range of stability of the cupric amine complex ion as shown in FIG. 4. Normal operating pH for a solution at 7.5 mol/L ammonium hydroxide and 1 mol/L ammonium carbonate is approximately 10.8 and slowly decreases primarily due to ammonia lost to vaporization.

The initial copper concentration can either be achieved by the addition of a cupric salt such as cupric sulfate pentahydrate, or by dissolution of metallic copper in the ammonium hydroxide and ammonium carbonate solution with oxygen sparging.

Processing times are decreased with increasing temperature at the cost of a lower ammonia solubility resulting in loss. Processing can be performed between 20 and 60° C. with an optimal temperature of approximately 50° C. for a solution containing 7.5 mol/L ammonium hydroxide.

Addition of an ammonium salt at a concentration of 1 mol/L increases the reaction rate of dissolution. Preferred salts include carbonate, halides, sulfate, or acetate with carbonate being the most preferred.

Figure 2B:
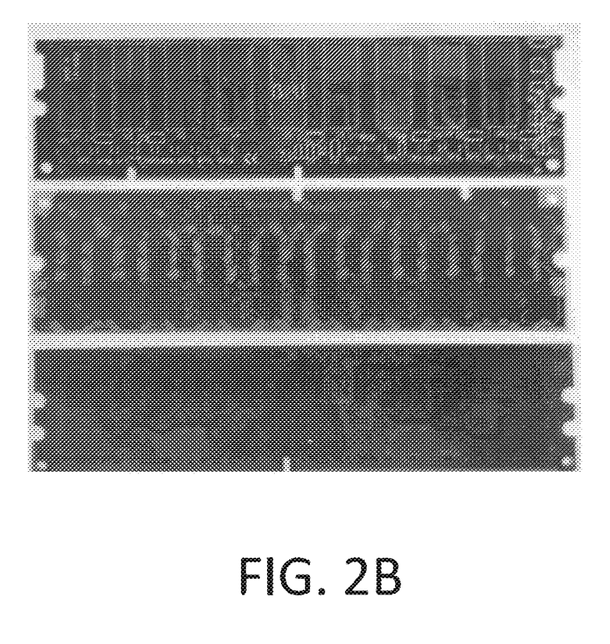
Figure 3:
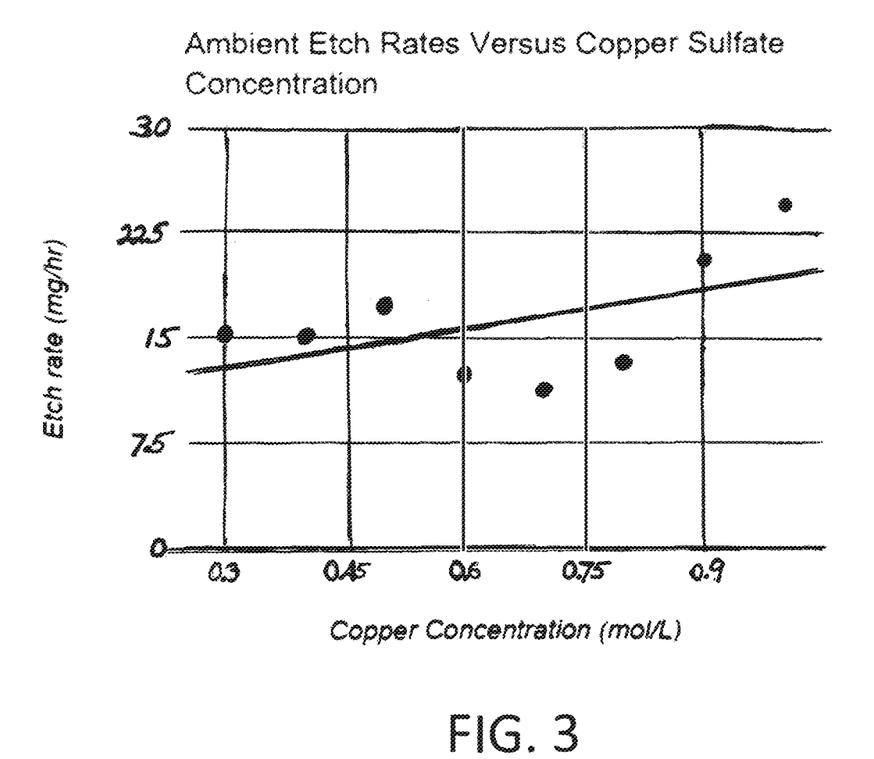
FIG. 3 depicts etching rates versus copper sulfate concentration.

After conducting the above mentioned reactions, the leached/etched copper remains in solution and may be recovered via various recovery steps. However and as shown in FIG. 2B, the precious metals loosen and separate from the integrated or printed circuit boards in the form of is chips, capacitors, and other electrical components, or in the form of metal flakes including gold plated connectors, along with various metallic and plastic debris, collectively known as "the product". More specifically, in certain aspects, the precious metals in the form of ceramic circuit board components, along with a powdery plastic and metallic residue, which may have gold flake from certain boards, loosen and separate from the boards. If further recovery of copper is desired, copper can be removed either chemically or electrically. For example, in certain aspects, pyrometallury may be used to "flash off" (i.e., burn off) any by-products in the product having a melting point below the desired precious metal to obtain the desired precious metal having a purity of at least 70%, of at least 80%, of at least 90%, of at least 95%, at least 99%, or at least 99.9%. Flashing temperatures can range from 300° C. to 800° C., from 450° C. to 800° C., from 500° C. to 700° C., or from 550° C. to 650° C.

The above reaction is quite selective for copper and will leave most metals, including iron, aluminum, lead or other solder, and precious metals untouched allowing for later recovery. Suitable raw materials include gold-clad or bonded scraps. Examples are gold from circuit board which separates, and is easily recovered, as a thin foil of metallic gold, often with a silvery nickel coating on one side. Precious metals inside chips are concentrated by the separation of these chips from the boards, and the removal of solder which separates from the chips and the boards as small, recoverable metallic particles. After processing, IC chips, capacitors, gold foil, and other components are easily separated mechanically by processes such as tumbling, shaking, spraying or otherwise agitating the treated boards. The chips can then be ground to expose the contained gold which is then recovered by conventional gold recovery processes. When contained in chips, capacitors or other components, other metals such as platinum, palladium, and silver may be recovered by similar procedures.

Figure 5:
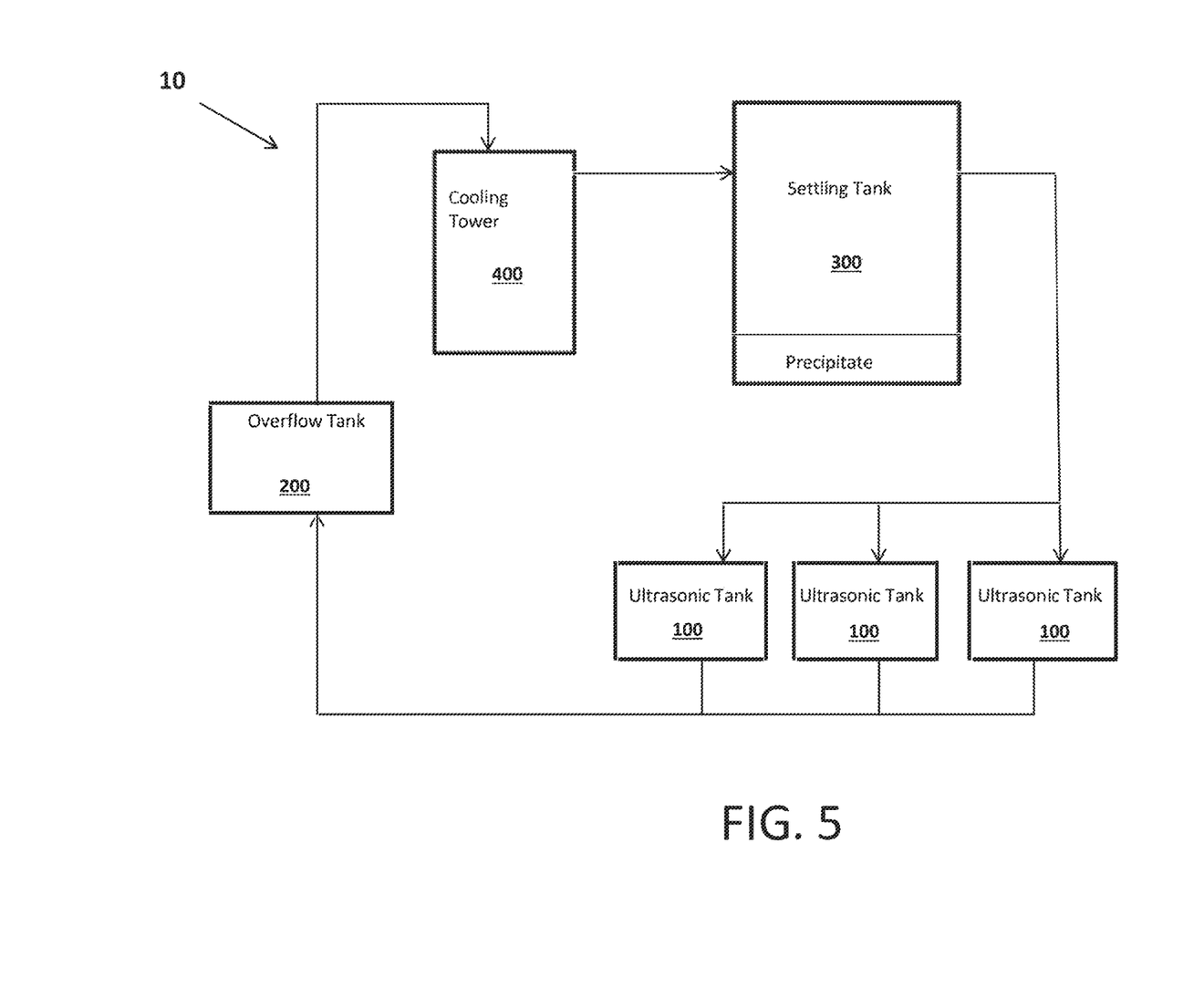
FIG. 5 is a schematic depiction of continuous system that implements the metal recovery processes disclosed herein.

FIG. 5 is a schematic depiction of a continuous system 10 that implements the metal recovery process(es) disclosed herein. As shown in FIG. 5, the continuous system 10 includes one or more ultrasound equipped tank(s) 100 that are operatively linked/in direct fluid communication with an overflow tank 200 (e.g., an inlet of the overflow tank) and a settling tank 300 (e.g., an outlet of the settling tank). As further shown in FIG. 5, a cooling tower 400 configured to moderate temperature of the disclosed system/method(s) is positioned between and operatively linked/in direct fluid communication with overflow tank 200 (e.g., the outlet of the overflow tank) and settling tank 300 (e.g., the inlet of the settling tank). The ultrasound equipped tank(s) 100 is preferably configured to carry out steps (a)-(c) of the disclosed method, and is particularly configured to provide ultrasound energy at a frequency ranging from 15 to 45 KHz, more preferably from 25 KHz to 35 KHz, most preferably from 29.5 KHz to 30.5 KHz and at a temperature ranging from 40° C. to 60° C., more preferably from 50° C. to 56° C. during any one of steps (a), (b), and/or (c). The ultrasound energy preferably limits solid metallic oxide(s) formation (e.g., CuO formation) and other by-products formation during the disclosed method thus allowing for optimal recovery of the desired metal.

As alluded to above, a continuous flow of cupric amine solution is entering and exiting ultrasound equipped tank 100. As shown in FIG. 5, the continuous flow of cupric amine solution exits the ultrasound equipped tank(s) 100 passes through overflow tank 200 into cooling tower 400. As the cupric amine solution is passed through the cooling tower 400, the cupric amine solution is cooled to a temperature ranging between 45-55° C. (e.g., preferably between 3 to 8° C. cooler than when the cupric amine solution exited ultrasound equipped tank). This cooled cupric amine solution is then passed to the settling tank 300 where copper oxide or any other precipitates in the cooled cupric amine solution are allowed to settle within the settling tank 300. The cooled cupric amine solution serves a dual role of maintaining desired temperature conditions in the continuous system 10 (and more particularly maintaining temperature conditions in the ultrasound equipped tank 100 such that temperatures do not exceed 60° C.) while also facilitating precipitation of copper oxide out of solution such that the copper oxide and other precipitates settle and/or are collected in the settling tank 300.

The cooled cupric amine solution is subsequently passed from the settling tank 300 to the ultrasound equipped tank 100 thereby allowing for steps (a)-(c) of the method to continue while the copper amine solution is continuously passed through the system 10. Formation of metal oxides, hydroxides, and other solids on the work face of the electronic waste is reduced in the ultrasound equipped tank 100 using the disclosed methods, which allows for optimum collection of the desired metal while avoiding premature quenching of the above discussed etching step(s).

Additionally, the steps described above, and working examples illustrated below, may optionally include electrolysis. Electrolysis is the process by which electric current is passed through a substance to effect a chemical change. The chemical change is one in which the substance loses or gains an electron (oxidation or reduction). The process is carried out in an electrolytic cell, an apparatus consisting of positive and negative electrodes held apart and dipped into a solution containing positively and negatively charged ions. The substance to be transformed may form the electrode, may constitute the solution, or may be dissolved in the solution. If the substance to be transformed is the electrode, the reaction is generally one in which the electrode dissolves by giving up electrons.

Figure 6:
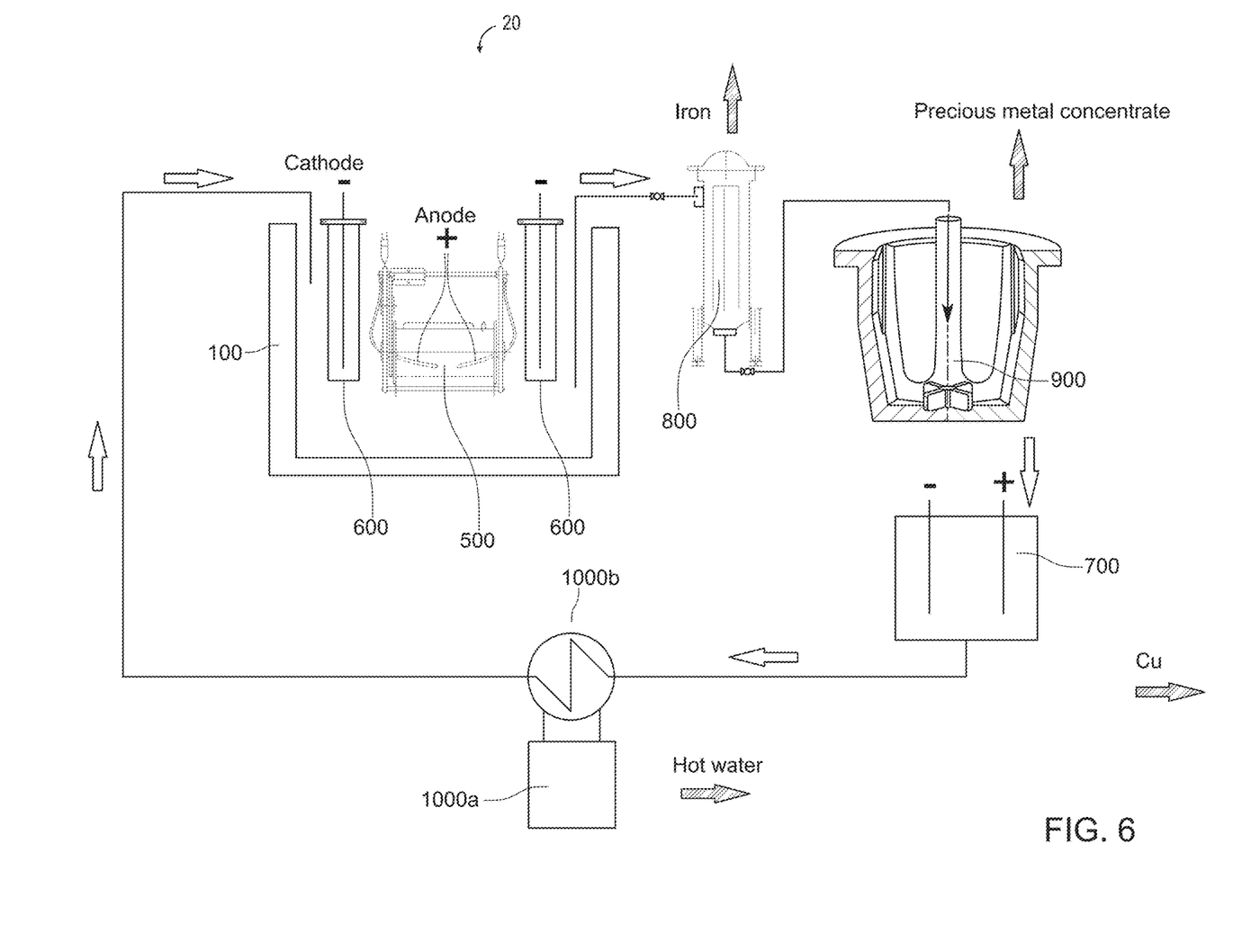
FIG. 6 is an illustration of a system that implements the metal recovery processes incorporating electrolysis, according to one or more embodiments of the presently disclosed subject matter.

According to one or more embodiments, ultrasound assisted electrolysis is used to extract precious metals from recycled electronic components as illustrated by system 20 in FIG. 6. The simultaneous use of the ultrasonic alkaline leach and an anodic current, as disclosed herein, results in a substantial reduction in leaching time.

The rate of copper dissolution of the present disclosure is further enhanced by the inclusion of a rotating electroplating barrel 500 submerged within the ultrasonic tank 100 that contains the copper-leaching solution. The barrel 500 can rest on the rim of the tank 100, sit on the bottom of the tank 100, or the barrel 500 can rest on an outer frame (not shown).

The barrel 500 can be made of perforated stainless steel, titanium, and other metal resistant to the alkaline leach. The barrel 500 may also be made from a thermo-plastic like polypropylene such as PVC, PVDF, PTFE and others. According to one embodiment, stainless steel is used because it is inexpensive, chemically resistant, and possesses good electrical conductivity properties. For example, stainless steel 304 or 316 may be used.

The barrel 500 contains the materials to be leached. For example, the materials to be leached may be printed circuit boards. The printed circuit boards (PCBs) can be shredded into smaller pieces, as illustrated in FIG. 1, for increasing the surface area exposed to the leaching solution, however the PCBs should not be shredded smaller than the holes in the barrel 500. According to one embodiment, the pieces are not smaller than 2"×2". The PCBs may also be leached in their larger, original form.

A motor, connected to a belt or similar transmission device is attached to the electroplating barrel 500. The motor will drive the barrel's rotation at a rate between 5-60 RPM. This rotation agitates the circuit boards, constantly exposing new copper surfaces to the leaching solution. Ultrasonic waves and direct current prevent surfaces from becoming masked by adjacent circuit boards.

Additionally, mechanical brushing and better electrical contact of the copper surfaces within the rotating barrel can be achieved by the inclusion of stainless-steel balls (or nuts, bolts, etc.) among the circuit boards.

The stainless-steel barrel acts as the anode of an electrolytic cell and the stainless-steel balls transmit the direct current to the metallic parts of the PCBs and produce some milling or brushing effect that strips the precious metal layer. The precious metal layer is continuously removed from the leaching tank, filtered, and sent to the precious metal refinery.

The cathode can be a plate, or perforated plate or could have a shape like a tridimensional mesh for example. The inner walls of the ultrasonic tank 100 can be also used as a cathode. Copper, stainless steel, titanium, or other metals, including any conductive material like graphite, boron doped diamonds, conductive ceramics, graphene or graphite cloth may be placed alongside the barrel and act as the cathode.

The cathode can be placed inside a bag made from polypropylene, PTFE, polyester, cotton, or other fabric. This is done to protect the cathode from contamination by the copper deposit. The cathode can be placed inside ceramic diaphragms 600 containing a catholyte. The catholyte can be the alkaline leach, a dilution of the alkaline leach or any other electrolyte containing copper, as copper sulfate.

The copper leaching solution within the ultrasonic tank 100 acts as the anolyte. The Anolyte and catholyte can be static batches or can be recirculated. The anolyte can be recirculated through an external electrowinning cell 700 to produce pure copper (Cu). The intensity of the current in the external electrowinning cell 700 can be the same as the current in the leaching tank 100, because the amount of copper produced in the electrowinning cell 700 is the same as the copper dissolved.

The cathodes and anode are connected to a rectifier that provides enough current intensity to dissolve the copper contained in the PCBs in the desired time, typically between 2 to 6 hours. The Voltage and amperage levels can be fixed otherwise known as constant voltage and constant amperage modes. An ampere-hour meter (AH Meter) can be used to control the end of dissolution.

Ultrasound and electrolysis can work together during the full leaching time or in a "pulse mode". For example, according to one embodiment, the ultrasound system can work continuously and the electrolysis can work 50 seconds per minute. According to another embodiment the electrolysis can work continuously, and the ultrasound can work 50 seconds per minute. Different sequences and variations of time may be used in pulse mode.

The synergistic effect of the ultrasonic alkaline leach and the anodic current causes the oxidation and dissolution of copper surfaces of the PCBs in a ratio that is six times faster than the ultrasonic leaching alone, according to the following equation:

$$Cu(s) \rightarrow Cu^{2+}(aq) + 2e^-$$

In the cathodic compartment the copper ions are deposited upon the cathode plates as solid copper according to the equation:

$$Cu^{2+}(aq) + 2e^- \rightarrow Cu(s)$$

Precious metals are part of the electronic scrap. Copper is the main metallic component because is good electrical conductor and cheaper than silver and gold. Precious metals cover the copper to provide better electrical contact and protect copper from oxidation by electrical current and air (oxygen, sulphur dioxide, etc.). When copper is dissolved, the precious metal layer is released as a slime (along with other undissolved metals such as tin, iron, lead, etc.) This slime containing precious metals is the concentrate. At this stage copper and plastic are separated and comprise roughly 80% of the initial mass.

There are several benefits to the presently disclosed subject matter as illustrated in FIG. 6. By adding electrolysis, leaching time can be reduced up to six-fold. Iron, an unwanted waste product, can be continuously removed through a magnetic filter 800. Pure copper is produced instead of copper oxide. The precious metal concentrate can be continuously separated through a centrifugal concentrator 900, and sent to a precious metal refinery. Optionally, the heat produced through leaching, and the heat produced in the electrowinning cells 700 can be recovered by use of a heap pump 1000a and heat exchanger 1000b. The recycling and repurposing of this heat energy has economic benefit.

WORKING EXAMPLES

Example 1

A sample of metallic copper, mounted in inert resin and polished to create a uniform surface is submerged in a solution of 0.3 mol/L cupric sulfate pentahydrate, 5 mol/L ammonium hydroxide and 1 mol/L ammonium carbonate. The initial surface area of the sample is $\frac{1}{4}in^2$. Dry air is sparged through the solution via a compressed glass aerator attached to the side of the reaction vessel. The solution was otherwise unagitated. Leaching was allowed to take place for 12 hours before the sample was removed and weighed. The sample lost 0.8557 g of copper which is an effective leach rate of 284 mg/hr/in$^2$ surface area sample.

Example 2

200 Gallon RAM Test 166.2 lbs of mixed RAM boards were loaded into a 200 gallon reaction vessel with agitator and oxygen bubbler. Initial solution conditions were approximately 0.3 mol/L copper provided by dissolution of copper scrap with oxygen bubbling. Ammonium hydroxide concentration was approximately 7.5 mol/L. Ammonium chloride was used as the salt additive at approximately 1 mol/L. The tank was constantly agitated via a propeller agitator. The tank was sealed and oxygen was supplied by the bubbler as necessary to regenerate the leaching solution. Tank temperature was allowed to fluctuate with ambient conditions. The above conditions and reactions were allowed to proceed for approximately 10 days before removing the RAM boards. 85.8 lbs of fully and partially stripped boards were recovered from the solution along with 67.7 lbs of precious metal containing chips, capacitors, and gold flake.

Example 3

200 Gallon Telecom Test 158 lbs of telecommunications boards were shredded longitudinally and loaded into a 200 gallon reaction vessel with agitator and oxygen bubbler. Initial solution was approximately 0.3 mol/L copper ion obtained by dilution of a previously used solution. Ammonium hydroxide concentration was approximately 7.5 mol/L. Ammonium carbonate was added at approximately 1.3 mol/L. The tank was sealed and oxygen was added as needed to regenerate leaching solution. Tank temperature was maintained at 60° C. during the day and was allowed to fall overnight. After approximately 5 days, 80.6 lbs of stripped and partially stripped boards were recovered from the reaction vessel. The remaining 49.8 lbs of recovered materials included IC chips, capacitors, gold flake, and other metallic and plastic pieces.

If desired, copper can be recovered from the leaching solution by either electrowinning to recover metallic copper, or by chemical methods such as precipitation of copper salts, or destruction of solution by pH change or heating to recover copper oxides, hydroxides or carbonates.

Example 4

Continuous Flow Ultrasonic System 1805 lbs of telecommunications boards were evenly distributed and loaded into three, 234 gallon ultrasonic vessels. A continuous flow of a cupric amine solution was pumped through these tanks from a single large settling tank, and initial solution conditions were approximately 1 mol/L copper ions, 7.5 mol/L ammonium hydroxide, and 1.0 mol/L ammonium carbonate. The tanks were sealed except for controlled venting to an ammonia scrubber using acetic acid, and the solution flowing through each tank was exposed to 8,000 Watts of ultrasonic power. This ultrasonic energy increased the temperature of the cupric amine solution while agitating the solution at the surface of the board's work face via cavitation, preventing the buildup of metallic oxide(s) and other by-products, which would have otherwise inhibited/quenched the reaction.

As the solution exited each ultrasonic vessel/tank, it first passed through a cooling tower, which maintained the solution temperature between 45-55° C., before being returned to the large settling tank, also referred to as the "Quiet Tank". The primary function of the settling tank was to maintain a quiet lower stratum, which encouraged the collection of precipitate at the bottom of the tank.

This system had the solution reach its lowest temperature as it entered the large settling tank, where copper oxide then precipitated out of the solution and collected at the bottom of the tank, while fresh solution was pumped from the lower level of the tank and re-circulated into the ultrasonic tanks. After being leached in the ultrasonic tanks for 50 hours, the boards were removed from the tanks and placed in a tumbler, which separated any product material remaining attached from the boards by impact and gravity. The initial 1805 lbs of boards yielded 812 lbs of product. This product yielded metal which returned $13.12 per pound. Therefore, this process gave us a value of $5.90 per pound of boards, while the current market price of boards at the time was $4.05 per pound.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A method for extracting a desired metal from a substance, the method comprising:
   contacting the substance with an alkaline leach to separate the desired metal from the substance;
   providing ultrasound energy and anodic current on a work face of the substance;
   etching the substance with the alkaline leach, thereby releasing the desired metal from the substance; and
   collecting the released desired metal.

2. The method of claim 1, wherein the substance includes integrated circuit boards, printed circuit boards, capacitors, metal fragments, large irregular granules, and small irregular granules.

3. The method of claim 2, wherein the metal fragments have a copper content between 70-80%.

4. The method of claim 3, further comprising leaching the fragments for 6-15 hours wherein 50-95% of the copper is removed from the fragments.

5. The method of claim 4, further comprising isolating precious metals from the fragment after the copper has been removed.

6. The method of claim 5, wherein precious metals include gold, platinum, silver, iridium, and palladium.

7. The method of claim 2, wherein the large irregular granules weigh between 10-20 grams.

8. The method of claim 2, wherein the small irregular granules weigh between 0.5 and 1.5 grams.

9. The method of claim 1, further comprising flashing off any by-products having a melting point below the desired metal.

10. A method for extracting a desired metal contained in a substance, the method comprising:
    contacting the substance with an alkaline leach to separate the desired metal from the substance;
    etching the substance with the alkaline leach, thereby releasing the desired metal from the substance;
    collecting the released desired metal; and
    purifying the desired metal, thereby resulting in a concentrated form of the desired metal, wherein the desired metal includes at least one metal selected from the group consisting of gold, platinum, silver, iridium, and palladium.

11. A method of extracting precious metals from electronic scrap comprising:
    placing electronic scrap into an ultrasound assisted electrolytic tank in the presence of an alkaline leach and anodic current, wherein the electronic scrap comprises:
    copper;
    iron; and
    precious metals;
    selectively dissolving the copper in the tank in the presence of an electrolyte;
    capturing iron with a magnet filter;
    in a centrifugal concentrator, separating the precious metals from the electronic scrap in a form of precious metal concentrate; and
    recovering copper in an electrowinning cell,
    wherein a heat pump maintains the temperature in the tank and electrowinning cell below 50 degrees Celsius, to avoid excess evaporation of alkaline leach, and produces hot water as a byproduct.

12. The method of claim 11, wherein the alkaline leach is selected from the group consisting of ammonia, cupric amine solution, ammonium hydroxide, and ammonium carbonate.

13. The method of claim 11, further comprising repurposing the hot water for sanitary and/or central heating purposes.

14. The method of claim 11, further comprising sending the precious metal concentrate to a refinery.

15. The method of claim 11, further comprising continuously withdrawing electrolyte from the tank while selectively dissolving the copper in the tank.

* * * * *